United States Patent
Weiss et al.

[11] Patent Number: 6,167,179
[45] Date of Patent: Dec. 26, 2000

[54] OPTICAL ELEMENT WITH CONGLUTINATED COMPONENTS

[75] Inventors: Alexander Weiss, Mönchengladbach; Klaus Nothofer, Erkrath, both of Germany

[73] Assignee: Alcatel, Paris, France

[21] Appl. No.: 09/163,509

[22] Filed: Sep. 30, 1998

[30] Foreign Application Priority Data

Oct. 10, 1997 [DE] Germany ............... 197 44 937

[51] Int. Cl.⁷ .................................................. G02B 6/44
[52] U.S. Cl. .......................... 385/103; 385/100; 385/114
[58] Field of Search .................................. 385/103, 100, 385/114

[56] References Cited

U.S. PATENT DOCUMENTS

| | | | |
|---|---|---|---|
| 4,538,881 | 9/1985 | Anctil et al. ............................. | 385/103 |
| 4,557,558 | 12/1985 | Bresser .................................... | 385/103 |
| 4,652,323 | 3/1987 | Butt ......................................... | 156/51 |
| 5,071,221 | 12/1991 | Fujitani et al. . | |
| 5,218,658 | 6/1993 | Macleod ................................. | 385/107 |
| 5,290,844 | 3/1994 | Otsuka .................................... | 524/426 |
| 5,621,841 | 4/1997 | Field . | |
| 5,649,041 | 7/1997 | Clyburn, III et al. . | |
| 5,684,904 | 11/1997 | Bringuier et al. . | |
| 5,761,361 | 6/1998 | Pfandl et al. .......................... | 385/100 |
| 5,970,196 | 10/1999 | Greveling et al. ...................... | 385/114 |

FOREIGN PATENT DOCUMENTS

| | | |
|---|---|---|
| 0 261 000 A2 | 3/1988 | European Pat. Off. . |
| 0 685 855 A1 | 12/1995 | European Pat. Off. . |
| 38 07 269 C1 | 3/1988 | Germany . |
| 42 28 956 A1 | 3/1994 | Germany . |
| 196 52 762 A1 | 8/1998 | Germany . |
| 63 026610 | 2/1988 | Japan . |

OTHER PUBLICATIONS

Patent Abstracts of Japan, vol. 012, No. 233 (P–724), Jul. 5, 1998 for JP 63 026610 A (Japan Vilene Co Ltd. et al) Feb. 2, 1998.

*Primary Examiner*—Frank G. Font
*Assistant Examiner*—Armando Rodriguez
*Attorney, Agent, or Firm*—Ware, Fressola, Van der Sluys & Adolphson LLP

[57] ABSTRACT

An elongated optical element is proposed with a core (2, 11), with several optical transmission units extending in the longitudinal direction of the element and affixed to the surface of the core (2, 11) with a layer (3,13) of a hot-melt adhesive, the layer (3,13) extending through cavities (7) disposed between the surface (6,14) of the core (2,11) and the transmission units, wherein the hot-melt adhesive can swell in water and wherein the layer thickness of the hot-melt adhesive is less than the diameter of the transmission units. Also described is a method for fabricating the element.

15 Claims, 1 Drawing Sheet

OPTICAL ELEMENT WITH CONGLUTINATED COMPONENTS

BACKGROUND OF THE INVENTION

1. Technical Field

The invention relates to an elongated optical element with conglutinated components and to a method for making the same.

2. Description of the Related Art

It is very important that elongated optical elements, such as multi-fiber buffer tubes or cables, are impervious to water in the longitudinal direction. The individual components of the optical element have frequently no mutually complimentary surfaces if the components are assembled from units, for example, with circular cross-sections. Cavities and gaps then remain between the components through which humidity can propagate. To create a solid water-tight cross-section, the cavities are frequently provided with a filler, such as petroleum jelly or a powder, which can expand in water. Otherwise, water may enter through joints or damaged areas and spread inside the element and adversely affect its mechanical and optical properties, in particular when the water freezes at low temperatures.

It is known from EP 0 261 000 B1 to fill the cavities with cable materials which can swell in water. The materials seal the cavity when moisture enters and thereby prevent water from spreading further along the cable. For easier handling, the materials are advantageously applied to the surface of a water-tight plastic support which due to its own volume and in cooperation with water-tight expansion members, reduces the cross-sections which have to be filled with the swellable materials.

The published application DE 42 28 956 A1 proposes to secure the fibers of an optical wire to a core with a high tensile strength by embedding the fibers in a layer of a hot-melt adhesive surrounding the core. Securing and arranging the fibers in this manner makes it easier to connect the element, for example, to a terminal. The hot-melt adhesive fills the remaining cavities between the fibers and the core and ensures imperviousness to water in the longitudinal direction. In addition, one or more elements are inserted in a metal or plastic protective tubing which is filled with a sealing compound.

It is known that optical cables can also be sealed using hot-melt adhesives a co-polymer of ethylene and vinyl acetate that swell in water. Such a hot-melt adhesive is available, for example, under the name Macromelt Q4402 from the producer Henkel KGaA (Dusseldorf, Germany). Because this material is expensive, it is generally not used to seal optical elements, in particular for large production quantities.

SUMMARY OF THE INVENTION

With the foregoing in mind, it is an object of the invention to develop an optical element that is positively sealed in the longitudinal direction and is inexpensive.

In a general aspect of the invention, it is recognized that those cavities in optical elements are particularly difficult to seal which remain between the surface of the water-tight core and the optical transmission units, e.g., optical fibers or multi-fiber buffer tubes, secured to the surface of the core. Liquid fillers have difficulty to reach these cavities when the transmission units are densely packed, so that a satisfactory water-tightness in that longitudinal direction cannot be guaranteed. For a number of applications, the cables should be dry, i.e. should not contain liquid filler compounds, such as petroleum jelly, in cross-section. Cracks can develop if the cavity is filled with a solid compound, for example with a hardened hot-melt adhesive, allowing moisture to spread. Introducing swellable materials into these cavities, e.g. in form of swelling threads disposed on the surface of the core, is also expensive and requires rather tight manufacturing tolerances, in particular with small cavity cross-sections.

With the foregoing in mind, it is proposed to secure the transmission units to the surface of the core with a hot-melt adhesive which swells in water. The adhesive layer covers the entire circumference of the core, i.e. also the remaining cavities between the core and the transmission units. The core is made of a material with a high mechanical strength providing tensile and, if necessary, also compressive relief for the transmission units. Consequently, the element is able to absorb mechanical stress and can be used as a component for optical ground or aerial cables. The outside of the element has a jacket or a sheath to protect the element from mechanical damage and moisture.

The hot-melt adhesive is applied as a thin layer to the surface of the core wherein the average layer thickness is less than the diameter of the transmission units. Preferably, the average layer thickness is less than the radius of the transmission units. If the transmission units are pressed into the liquid hot-melt adhesive, then the adhesive fills at least partially, and possibly even completely the cavities between the transmission units and the core. Moreover, the adhesive does not overflow at all or at most slightly. Any remaining gaps between the transmission units and the outer jacket layers of the element are filled with other conventional sealing compounds or swellable elements, e.g. a swelling fabrics, and possibly water-tight fillers.

Advantageously, the element of the invention has excellent water-tightness in the longitudinal direction, since the water swellable hot-melt adhesive prevents any moisture from spreading along the surface of the core. Even if the cavities still have small open sections in this region, the hot-melt will fill these cavities when moisture enters. The element is also easier to manufacture because there is no need to introduce by a complex process a solid sealing material into the relatively small cavities located at the core surface. The element is also inexpensive because only a small amount of adhesive is used. Finally, the element is easy to handle due to the well-defined arrangement of the transmission units on the surface of the core. In addition, liquid sealing compounds, such as petroleum jelly, can be eliminated across the entire cross-section of the element.

In an advantageous embodiment of the invention, the optical element is a multi-fiber buffer tube or a component of a multi-fiber buffer tube. The transmission units are optical fibers, e.g. glass fibers. The optical element can also be a cable and the transmission units can be waveguides or multi-fiber buffer tubes. The multi-fiber buffer tubes themselves can form elements constructed in the manner described above.

Instead of aligning the transmission units exactly parallel with the element, the transmission units can advantageously be stranded around the core or arranged on the core with small undulations. This feature prevents damage when the element is bent.

In another aspect, water-tight dummy elements or electrical conductors can also be arranged on the surface of the core, with the optical transmission units extending therebetween. Preferably, the dummy elements and the conductors, respectively, have the same outside diameter as the transmission units and together form—when densely packed—on the surface of the core a layer with an approximately constant thickness.

The core is preferably made of a material that can be highly stressed mechanically, in particular of a material with a high tensile strength. It is therefore proposed to make the core material of a fiber-reinforced plastic, in particular glass fiber reinforced plastic, or steel.

In the present invention, the inside of the core can be arranged in any manner as long as the core satisfies the mechanical requirements. For example, the core may be a tube with an annular cross section. In this case, one or several optical fibers, for example a multi-fiber buffer tube, can extend through the core.

Even less hot-melt adhesive is required in the element if the surface of the core is provided with revolving strips of an adhesive which are spaced from each other along the longitudinal axis of the element.

The core and the transmission units are surrounded by a water-tight jacket layer, for example a wire sheath or a cable jacket. The jacket layer or the sheath can include one or several layers made of, for example, metal or plastic, and may also include an aluminum layer as a water barrier or a strain relief. Any gaps between the jacket layer and the transmission units preferably contain water-swellable elements, such as a swelling fabric, a swelling foil or swelling threads. The swellable elements can also be a material with a high tensile strength, such as aramide, glass fibers or polyethylene, e.g. in the form of rovings covered with a swellable coating. Composite elements with high tensile strength units and swellable fabrics are also contemplated. The swellable elements themselves can then provide strain relief. The side of the swellable elements facing away from the core has a liquid hardenable coating, e.g. a hot-melt adhesive, to fill the space. The hardened coating provides a frictional connection between the swellable elements and the jacket. The resulting cable is dry, easily to handle and does not contain a liquid filler compound. Alternatively, gaps between the transmission units and the jacket layer, in particular in between the optical fibers, can be filled with a hydrophobic medium, preferably a thixotropic mass.

Advantageously, the hot-melt adhesive is introduced into the element by coating the core with a liquid adhesive, preferably by dip-coating. In this process, the core is passed, e.g. in the longitudinal direction, through a volume filled with the hot adhesive. The core exits through an opening wherein the diameter of the opening determines the layer thickness on the surface. The transmission units are subsequently placed on the liquid adhesive layer, with the adhesive filling any cavities between the transmission units and the core. In this way, thin layers of adhesive can be applied that use very little material and reliably seal the cavities in the longitudinal direction.

Advantageous embodiments of the optical element of the invention are described hereinafter with reference to the schematic drawing.

DETAILED DESCRIPTION OF THE INVENTION

Figure 1:
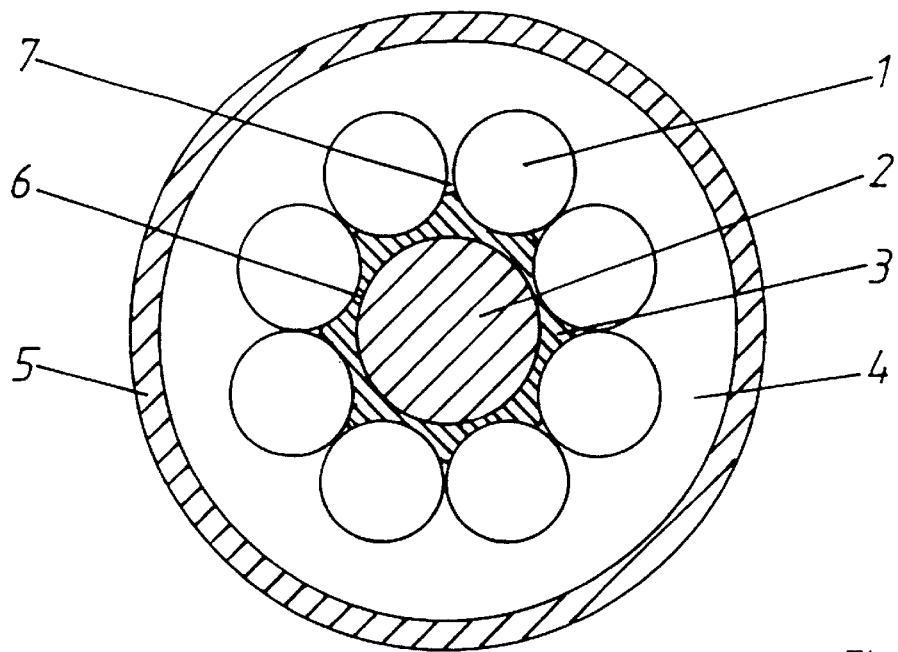
FIG. 1 is a cross-sectional view of a multi-fiber buffer tube.

The multi-fiber buffer tube illustrated in FIG. 1 includes as transmission units several optical fibers 1, e.g. comprised of an optical waveguide fiber core with one or several outer plastic coatings. To facilitate handling and to enhance tensile strength, the fibers 1 are secured to a core 2 which is made of a material with a high tensile strength, for example, glass fiber reinforced plastic. The fibers 1 are affixed with a layer 3 of a hot-melt adhesive with an average thickness which is less than the radius of the fibers 1, so that only a small amount of adhesive is required. The outside of the core 2 and the fibers 1 are surrounded by a water repellent thixotropic gel 4 which fills the jacket layer 5 of the multi-fiber buffer tube.

Small cavities 7 and gaps which are not penetrated by either the adhesive or the gel 4, can remain between the surface 6 of the core 2 and the fibers 1. The adhesive is able to swell in water and can prevent moisture in this region from spreading in the longitudinal direction of the multi-fiber buffer tube. When moisture enters, the adhesive then seals any remaining cavities and reliably seals the multi-fiber buffer tube in the longitudinal direction.

Figure 2:
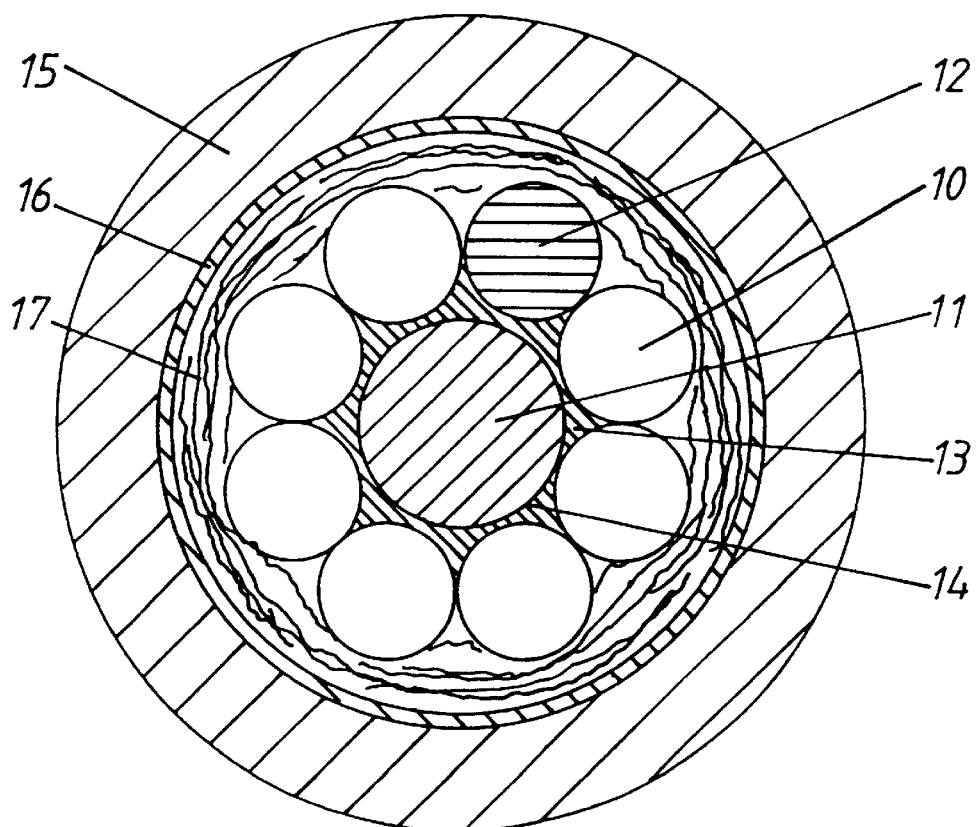
FIG. 2 is a cross-sectional view of a cable.

FIG. 2 shows an optical cable in cross-section. The transmission units are multi-fiber buffer tubes 10 which are stranded about a core 11 which is resilient against tensile and compressive stress. The multi-fiber buffer tubes 10 are affixed with a layer 13 of a water-swellable hot-melt adhesive applied to the surface 14 of the core. One or more of the multi-fiber buffer tubes can be replaced by dummy elements and/or electrical conductors 12. The outside of the cable is surrounded by a jacket 15 that can include elements with a high tensile strength or an aluminum foil 16 to form a water-tight barrier layer. A fabric element 17 is disposed in the gap between the jacket 15 and the multi-fiber buffer tube 10 and can be a plastic support coated with a water-swellable material. The cable is then water-tight in the longitudinal direction over its entire cross-section, while at the same time completely eliminating liquid materials for sealing.

The embodiments described above admirably achieve the object of the invention. However, it will be appreciated that departures can be made by those skilled in the art without departing from the spirit and scope of the invention which is limited only by the following claims.

What is claimed is:

1. An elongated optical element comprising:
   (a) a core having a surface;
   (b) several optical transmission units extending in a longitudinal direction of the element, each of the several optical transmission units having a diameter; and
   (c) a layer of hot-melt adhesive affixing the optical transmission units to the surface of the core, the layer having a thickness less than the diameter of any of the optical transmission units, the hot-melt adhesive is able to swell in water to extend into cavities between the surface of the core and the optical transmission units.

2. The element according to claim 1, wherein the optical transmission units comprise optical fibers.

3. The element according to claim 1, wherein the optical transmission units are multi-fiber buffer tubes.

4. The element according to claim 1, wherein the optical transmission units are stranded about the core.

5. The element according to claim 1, wherein at least one dummy element is arranged adjacent the surface of the core.

6. The element according to claim 5, wherein at least one electrical conductor is arranged adjacent the surface of the core.

7. The element according to claim 1, wherein at least one electrical conductor is arranged adjacent the surface of the core.

8. The element according to claim 1, wherein the core is made from a material selected from the group consisting of a glass fiber reinforced plastic and steel.

9. The element according to claim 1, wherein the core has an annular cross-section.

10. The element according to claim 9, wherein the core has at least one optical fiber.

11. The element according to claim 1, wherein the layer of the hot-melt adhesive has sections disposed on the surface of the core which are spaced apart in a longitudinal direction.

12. The element according to claim 1, further including a water-tight jacket layer surrounding the optical transmission units and the core.

13. The element according to claim 12, further including water swellable elements in an area between the optical transmission units and the water-tight jacket layer.

14. The element according to claim 12, further including a hydrophobic medium in an area between the optical transmission units and the water-tight jacket layer.

15. Method for fabricating an elongated optical element comprising the steps of:
 (a) providing a core having a surface;
 (b) dip-coating the core with a hot-melt adhesive to create a liquid adhesive layer on the surface; and
 (c) placing several optical transmission units on the liquid adhesive layer.

* * * * *